United States Patent Office 2,734,797
Patented Feb. 14, 1956

2,734,797

PURIFICATION OF TiCl₃

Gordon B. Skinner, Dayton, Ohio, assignor to Monsanto Chemical Company, St. Louis, Mo., a corporation of Delaware No Drawing. Application October 31, 1952,
Serial No. 318,102

5 Claims. (Cl. 23—87)

This invention relates to the purification of titanium trichloride, and more specifically to gaseous mixtures containing titanium trichloride and carbon monoxide in which carbon monoxide is present in small amounts as an impurity.

The production of titanium trichloride is often carried out under conditions such that carbon monoxide is also produced. For example, when titanium trichloride is prepared by the reduction of titanium tetrachloride with titanium carbide at high temperatures, there is almost invariably a small amount of oxygen present as an impurity in the titanium carbide. This oxygen will form carbon monoxide gas which will be mixed with the gaseous titanium trichloride. During the cooling of such a gaseous mixture to condense titanium trichloride as a solid, the carbon monoxide will react with the titanium trichloride to form solid titanium monoxide and titanium carbide which contaminate the condensed solid titanium trichloride. The contaminants are probably formed according to the reaction represented by the following equation in which the letters "g" and "s" in parentheses indicate the physical state of the various compounds to be either gaseous or solid, respectively:

(Eq. 1) $8TiCl_3(g) + CO(g) \rightarrow 6TiCl_4(g) + TiO(s) + TiC(s)$

In order to avoid the TiO and TiC impurities in the solid TiCl₃, it is highly desirable to separate carbon monoxide from the gaseous mixture prior to the condensation of the titanium trichloride.

We have now found that the effect of temperature upon the reaction rate and the chemical equilibrium constant of the foregoing reaction (Eq. 1) and upon the vapor pressures of titanium carbide, titanium monoxide, and titanium trichloride, is such that the carbon monoxide can be separated from gases containing titanium trichloride and carbon monoxide by cooling the gaseous mixtures to a temperature at which the carbon monoxide gas will react substantially completely with titanium trichloride gas to form solid TiO and TiC.

Since the removal of the impurity (carbon monoxide) is accomplished at the expense of a portion of the product being purified (titanium trichloride), the present purification measure is most useful in cases where the concentration of carbon monoxide is very small in comparison with the concentration of titanium trichloride, e. g., when the concentration of carbon monoxide in the gas stream is less than about 2 per cent by weight, based upon the total of carbon monoxide and titanium trichloride. In general, the invention can be very advantageously utilized when the carbon monoxide is present in concentrations less than about one per cent by weight, and preferably less than about 0.5 per cent by weight, based upon the total of titanium trichloride and carbon monoxide.

The temperature to which the gaseous mixture must be cooled to effect the removal of the carbon monoxide will depend upon the partial pressures of carbon monoxide, titanium trichloride, and titanium tetrachloride in the mixture. This dependency may be better appreciated by a consideration of the expression for the equilibrium constant for Equation 1:

$$K_p = \frac{p^6{TiCl_4}}{p^8{TiCl_3}} \cdot p_{CO}$$

wherein 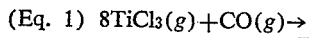,  and pco represent the partial pressures of the respective gases indicated by the subscripts.

At very high temperatures the value of $K_p$ is relatively low so that rather high concentrations (or partial pressures) of titanium trichloride and carbon monoxide can coexist in the gas phase without the tendency to react according to the reaction of Equation 1. However, $K_p$ increases rather rapidly with decreasing temperature, so that the partial pressures of titanium trichloride and carbon monoxide which can coexist in the gas without tending to form titanium tetrachloride, oxide, and carbide, decrease markedly with decreasing temperatures. Thus, upon slowly cooling any gaseous mixture containing both titanium trichloride and carbon monoxide, a temperature will be reached at which the monoxide will begin to react with the trichloride according to Equation 1, thereby precipitating titanium monoxide and titanium carbide as solids. It can be readily recognized that this temperature at which the reaction is initiated, i. e., the maximum temperature for removal of carbon monoxide, will depend upon the particular gaseous mixture being processed, and more particularly upon the partial pressures of titanium trichloride, carbon monoxide and titanium tetrachloride in said mixtures.

Upon further cooling, the equilibrium constant continues to increase so that more carbon monoxide and titanium trichloride must react in order to decrease the partial pressures thereof. Theoretically, the carbon monoxide can never be absolutely completely removed by this procedure, but the temperature function of the equilibrium constant is such that the concentration of carbon monoxide is reduced to a practically insignificant value before the dewpoint temperature of the titanium trichloride gas in the mixture is reached. Therefore, if a mixture containing titanium trichloride and carbon monoxide gases is cooled to the temperature of the dewpoint of titanium trichloride, or to within about 50° C. or 100° C. of the dewpoint, and the gases separated from the solid titanium carbide and solid titanium oxide which will have precipitated during the cooling, the remaining trichloride gas will be practically free from (i. e., will contain only a few parts per million of) carbon monoxide.

If even greater purity is desired, the carbon monoxide removal can be continued by cooling below the dewpoint temperature of titanium trichloride (thereby condensing a mixture of trichloride, monoxide, and carbide), and separating the remaining gases, to obtain the very highly purified titanium trichloride.

For example, a typical gaseous composition to which the present invention might be advantageously applied is one containing a predominant amount (by weight) of titanium tetrachloride, about 20 weight per cent of titanium trichloride, and less than about 0.05 weight per cent of carbon monoxide. With such a gas composition at a total pressure of about one atmosphere, the temperature of carbon monoxide removal will generally be between about 1200° C. and about 700° C.

After condensing the solid TiO and TiC, the remaining gas containing the TiCl₃ is separated from the solids. This gaseous TiCl₃ may be further treated or utilized as a gas, but according to a preferred embodiment of the present invention the gas is further cooled to condense the remaining TiCl₃, which will be substantially free of impurities which would have been present if the carbon monoxide had not been previously separated therefrom. This second cooling stage should be to a temperature below the dewpoint temperature of the titanium trichloride, and preferably below about 500° C., (if the dewpoint temperature is higher than 500° C.).

It should be understood that the present purification process is not restricted to gaseous mixtures containing only carbon monoxide and titanium halides, but that other inert constituents, such as argon, may also be present.

The following example is a description of a specific embodiment of the present invention and should not be construed as limiting the invention in any way.

Example

Gaseous titanium tetrachloride is passed over a solid titanium carbide at about 1200° C. The titanium carbide contains a small amount of oxygen as an impurity, (probably in the form of oxycarbide) so that the resultant gases contain titanium tetrachloride, titanium trichloride, and a very small amount of carbon monoxide. These gases are slowly cooled by passing through a cooling chamber at about 700° C. where solid TiO and TiC are deposited. The gases are then further passed to a second cooling chamber at about 250° C. to precipitate highly purified $TiCl_3$ solid.

What I claim is:

1. The method of purifying $TiCl_3$ with respect to CO by removing CO from a hot gaseous mixture containing $TiCl_3$ and less than 1 mole proportion of CO per 8 mole proportions of $TiCl_3$, which method comprises cooling said gases to a temperature at which CO reacts with $TiCl_3$ to form a precipitation comprising TiC and TiO, and then separating said solids from the remaining gaseous $TiCl_3$.

2. The method of purifying $TiCl_3$ with respect to CO by removing CO from a hot gaseous mixture containing a predominant weight per cent of $TiCl_4$, less than about 20 weight per cent of $TiCl_3$ and less than about 0.05 weight per cent of CO, the proportion of CO also being less than ⅛ that of the $TiCl_3$ on a mole basis, said weight percentages being based upon the total of $TiCl_4$, $TiCl_3$ and CO, which method comprises cooling said gaseous mixture to a temperature at which the CO reacts with $TiCl_3$ to form a solid precipitate comprising TiC and TiO, and then separating said solids from the remaining gaseous $TiCl_3$.

3. The method of recovering purified $TiCl_3$ from a hot gaseous mixture containing $TiCl_3$ and a minor amount of CO which is less than about 1 percent of the total weight of $TiCl_3$ and CO, which method comprises cooling said gaseous mixture to a temperature at which substantially all of the CO reacts with $TiCl_3$ to form a solid precipitate, separating said solids from the remaining gases, and further cooling the remaining gases to condense solid $TiCl_3$ therefrom.

4. The method of recovering purified $TiCl_3$ from a hot gaseous mixture containing $TiCl_3$ and a minor amount of CO which is less than about 0.5 per cent of the total weight of $TiCl_3$ and CO, which method comprises cooling said gaseous mixture to a temperature above the dew point of $TiCl_3$ in said mixture but to a temperature at which substantially all of the CO reacts with $TiCl_3$ to form a solid precipitate comprising TiC and TiO, separating said solids from the remaining gases, and further cooling said remaining gases to below the dew point of $TiCl_3$ in said remaining gases, thereby condensing $TiCl_3$.

5. The method of recovering purified $TiCl_3$ from a hot gaseous mixture containing a predominate weight per cent of $TiCl_4$, less than about 20 weight per cent of $TiCl_3$ and less than about 0.05 weight per cent of CO, said percentages being based upon the total of $TiCl_4$, $TiCl_3$ and CO, the proportion of CO also being less than ⅛ that of the $TiCl_3$ on a mole basis, which method comprises cooling said gaseous mixture to a temperature above but within about 100° C. of the dew point of the $TiCl_3$ in said mixture and to a temperature at which substantially all of the CO reacts with $TiCl_3$ to form a solid precipitate comprising TiC and TiO, separating said solids from the remaining gases, and thereafter, further cooling said remaining gases to a temperature below the dew point of the $TiCl_3$ in the said remaining gases, thereby condensing solid $TiCl_3$.

No references cited.